US007281841B2

(12) United States Patent
Foong et al.

(10) Patent No.: US 7,281,841 B2
(45) Date of Patent: Oct. 16, 2007

(54) METHOD FOR MIXING A LIQUID/LIQUID AND/OR GASEOUS MEDIA INTO A SOLUTION

(75) Inventors: Weng Chuen Foong, Perak (MY); Paul Woodley, Perak (MY)

(73) Assignee: World Max Alliance Limited, Tortola (VG)

( * ) Notice: Subject to any disclaimer, the term of this patent is extended or adjusted under 35 U.S.C. 154(b) by 612 days.

(21) Appl. No.: 10/478,944

(22) PCT Filed: May 22, 2002

(86) PCT No.: PCT/AU02/00635

§ 371 (c)(1), (2), (4) Date: Aug. 2, 2004

(87) PCT Pub. No.: WO02/096542

PCT Pub. Date: Dec. 5, 2002

(65) Prior Publication Data

US 2004/0246814 A1 Dec. 9, 2004

(30) Foreign Application Priority Data

May 31, 2001 (AU) .................................... PR5363

(51) Int. Cl.
*B01F 3/04* (2006.01)
*B01D 47/00* (2006.01)

(52) U.S. Cl. ............................... 366/162.4; 366/165.2; 261/121.1

(58) Field of Classification Search ................ 366/336, 366/165.1, 165.2, 165.5; 261/119.1, 121.2, 261/121.1; 210/220, 221.2
See application file for complete search history.

(56) References Cited

U.S. PATENT DOCUMENTS

| | | | | |
|---|---|---|---|---|
| 1,924,038 A | * | 8/1933 | Herbsman et al. | 366/165.2 |
| 2,528,094 A | * | 10/1950 | Walker | 366/165.2 |
| 3,261,593 A | * | 7/1966 | Sharples | 366/165.2 |
| 4,606,822 A | | 8/1986 | Miller | |
| 5,460,449 A | | 10/1995 | Kent | |

FOREIGN PATENT DOCUMENTS

DE 1951744 C 1/1995

* cited by examiner

*Primary Examiner*—Tony G. Soohoo
(74) *Attorney, Agent, or Firm*—Skinner & Associates

(57) ABSTRACT

The invention relates to a mechanical device with no moving parts that homogeneously mixes two or more liquids or liquids and gases. It is possible with the device to totally saturate liquids with gas droplets of less than one micron. The device comprises an inlet for partially mixed components leading to a plurality of passageways converging axially into a chamber which has radial openings into another chamber defined by a conical member converging in the axial direction and having an opening at its apex to exit the mixed components, the components exiting the radial openings collide with the walls of the conical member producing shear and turbulence and subsequently spinning within the conical member and are then subjected to increased pressure in the axial direction by the converging wall of the conical member.

1 Claim, 1 Drawing Sheet

METHOD FOR MIXING A LIQUID/LIQUID AND/OR GASEOUS MEDIA INTO A SOLUTION

FIELD OF THE INVENTION

The invention relates to a method of mixing liquid/liquid and/or gaseous components together so as to prevent separation for the maximum period of time. The method also requires the minimum use of energy to achieve the desired results.

BACKGROUND OF THE INVENTION

It is the requirement of a number of industries to produce a liquid with totally saturated gases. Of major importance is the treatment of wastewater. Air flotation systems are used in almost every wastewater treatment process to separate and float away contaminants as sludge from the wastewater. These systems are used by a wide variety of industries such as food processing, catering, hotels, restaurants, petrochemical, industrial, mining and the marine industries.

The production of liquids with totally saturated gas component is very difficult, as a gas does not readily mix with a liquid to form a stable solution. The method described provides a system that is ultra efficient in incorporating a gas into a liquid with bubble sizes ranging from one to a hundred microns whilst retaining low cost to manufacture.

Examples of its uses are as follows but are not limited to these. Removal of emulsified oils and grease from water and wastewater is difficult and requires very expensive centrifuge equipment which has limited capacities. The system described can achieve improved results with greater flows at significantly reduced capital and operating cost. Another example of its use is the air flotation of flocculated waste components by very fine air bubbles from a flow of wastewater. Yet another example is the separation of fine fiber particles from fruit juice by floating the fiber particles to the top surface of a separation tank.

BRIEF DISCUSSION OF THE INVENTION

The invention relates to mechanical device with no moving parts that homogeneously mixes two or more liquids or alternatively liquids and gases. In the case of liquids and gases it is possible to totally saturate the liquid with gas droplets of less than one micron. It is also possible to control the bubble size by adjusting the gas flow rate, feed pressure to the unit and the discharge pressure from the unit described to achieve the desired results.

DETAILED DESCRIPTION OF THE INVENTION

Refer Drawing FIG. 1

Figure 1:
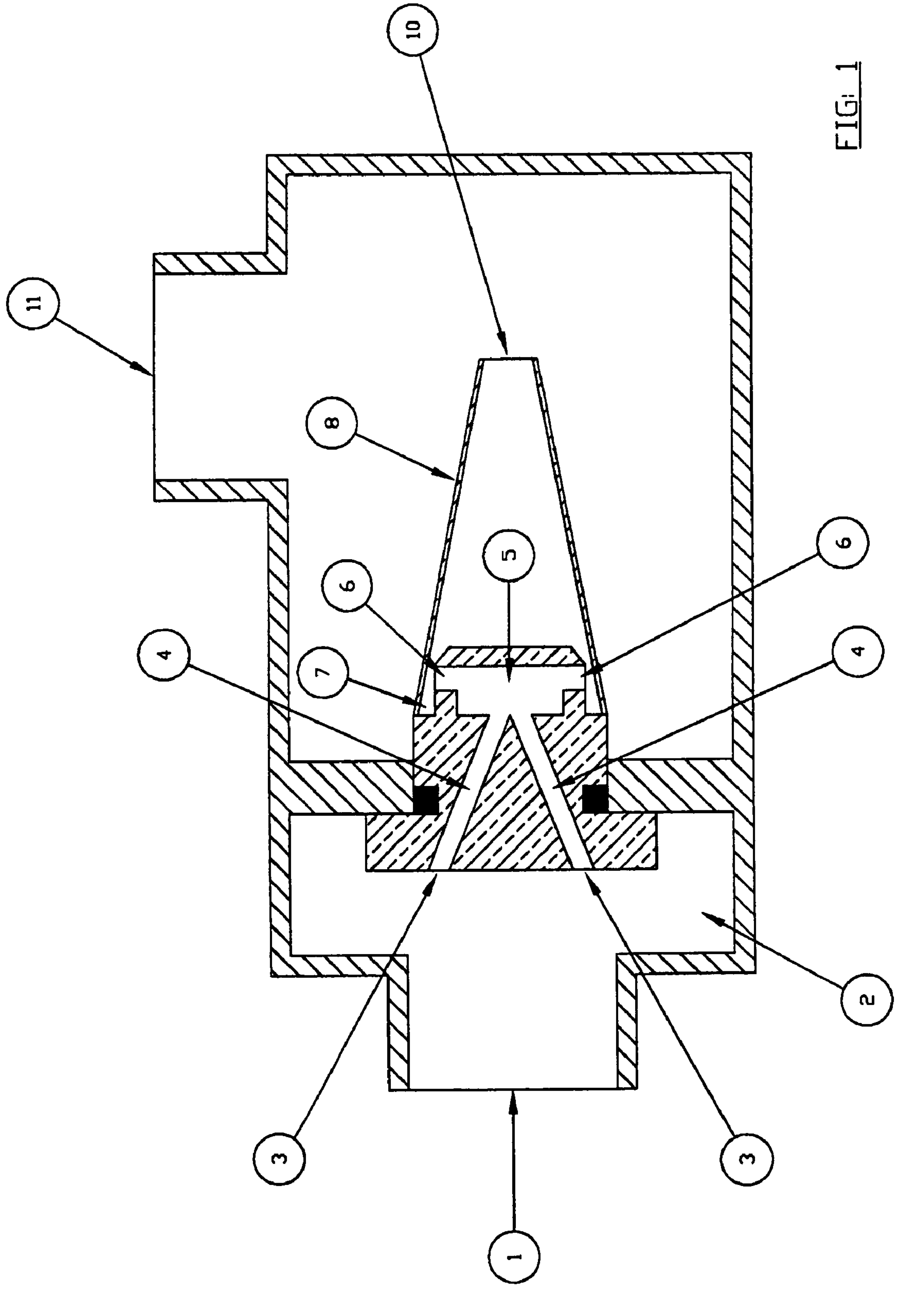
FIG. 1 shows an embodiment of the present invention.

A liquid media such as water requires to have a gaseous media such as air thoroughly and homogeneously saturated and mixed into solution. A liquid media such as water has air or another gaseous media introduced which flows into the aerated inlet (1) at high pressure and enters the distribution chamber (2) before entering two or more inlet conduits of the Dynamic Converging Aspirator (DCA) (3).

The aerated liquid passes through the conduit (4) at very high velocity and exits at the converging zone (5) where high shear and turbulence take place in such a manner that significant particle reduction in the air or gaseous media takes place in convergence zone (5).

The liquid phase becomes completely saturated with very fine air or gaseous media bubbles in convergence zone (5).

The saturated liquid/air (gaseous media) exits the convergence zone (5) through one or more tangential conduit (6), which are tangential to the internal circumference of the converging zone (5).

The liquid/air (gaseous media) mixture which is still under high pressure exits the one or more conduits (6) at ultra high velocity and passes to a chamber (7) where on impact with the conical outer wall of the chamber (7) the liquid/air (gaseous media) is made to rotate at ultra high speed.

The liquid/air (gaseous media) is under very high pressure as a result of the reduction in area between the conical chamber (8) and the outer periphery of the boss (9).

The liquid/air (gaseous media) which is now rotating at high velocity in conical sleeve (8) accelerates in rotation as it passes along and moves towards the conical sleeve (8) outlet at point (10) where additional back pressure is applied due to the reduction in the area of the exit conduit (10) and passes into the outlet chamber (11).

The result of this rapid rotational acceleration and pressure drop is to shear the air (gaseous media) droplets and totally saturate the liquid phase with air (gaseous media) droplets approaching microns in size, and which are in a totally homogeneous mixture.

The invention claimed is:

1. A mixing device for fluid/gas components comprising:

a body having a first and a second chamber, an inlet for partially mixed components in fluid communication with the first chamber and an outlet for highly mixed fluid/gas components in fluid communication with the second chamber, a second body located between the first and second chambers having a plurality of passageways and a third chamber, the passageways converging axially in the direction from the first chamber to the second chamber and in fluid communication with the first and third chambers such that fluid/gas flows exiting the passageways collide with each other in the third chamber to produce shear and turbulence, the third chamber having radial openings in fluid communication with a fourth chamber located within the second chamber and defined by a conical member converging in the said axial direction and having an opening at its apex such that fluid/gas exiting the radial openings collide with the walls of the conical member producing further shear and turbulence and subsequently spinning within the fourth chamber and being subjected to increasing pressure forces in said axial direction by the converging walls of the conical member before entering the second chamber.

* * * * *